(12) United States Patent
Romer et al.

(10) Patent No.: US 11,519,260 B2
(45) Date of Patent: Dec. 6, 2022

(54) ROD PUMP POSITION MEASUREMENT EMPLOYING WAVE-BASED TECHNOLOGIES

(71) Applicant: ExxonMobil Upstream Research Company, Spring, TX (US)

(72) Inventors: Michael C. Romer, The Woodlands, TX (US); Tony W. Hord, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 524 days.

(21) Appl. No.: 16/589,249

(22) Filed: Oct. 1, 2019

(65) Prior Publication Data
US 2020/0190965 A1 Jun. 18, 2020

Related U.S. Application Data

(60) Provisional application No. 62/786,126, filed on Dec. 28, 2018, provisional application No. 62/779,189, filed on Dec. 13, 2018.

(51) Int. Cl.
*E21B 47/009* (2012.01)
*E21B 43/12* (2006.01)
(Continued)

(52) U.S. Cl.
CPC .......... *E21B 47/009* (2020.05); *E21B 43/127* (2013.01); *G01S 7/4815* (2013.01);
(Continued)

(58) Field of Classification Search
CPC ............................. E21B 43/127; E21B 47/009
See application file for complete search history.

(56) References Cited

U.S. PATENT DOCUMENTS 4,541,274 A * 9/1985 Purcupile .............. E21B 47/009
166/250.15
6,328,102 B1 12/2001 Dean
(Continued)

FOREIGN PATENT DOCUMENTS

EP 2 077 374 A1 7/2009
GB 2 393 747 A 4/2004
(Continued)

*Primary Examiner* — Robert E Fuller
(74) *Attorney, Agent, or Firm* — ExxonMobil Upstream Research Company—Law Department

(57) ABSTRACT

A method of operating a reciprocating system including a rod pump for pumping liquids from a wellbore. The method includes determining rod position of the rod pump using a wave-based technology detector, the rod pump comprising a rod string carrying a down hole pump and a drive system including a drive motor coupled to the rod string through a transmission unit; communicating rod position to a data acquisition system receiving one or more other measurements of rod pump operation to determine rod pump performance; and adjusting at least one operating parameter to enhance rod pump performance. A method of determining operating parameters and optimizing performance of an oil or gas production rod pump, and a system for determining rod position of an oil or gas production rod pump are also provided.

25 Claims, 3 Drawing Sheets

(51) Int. Cl.

| | | |
|---|---|---|
| *G01S 7/481* | (2006.01) | |
| *G01S 13/86* | (2006.01) | |
| *G01S 17/87* | (2020.01) | |
| *G01S 15/86* | (2020.01) | |
| *G01S 17/89* | (2020.01) | |
| *G01S 13/88* | (2006.01) | |
| *G01S 13/89* | (2006.01) | |

(52) U.S. Cl.
CPC ............ *G01S 13/865* (2013.01); *G01S 13/88* (2013.01); *G01S 13/89* (2013.01); *G01S 15/86* (2020.01); *G01S 17/87* (2013.01); *G01S 17/89* (2013.01); *G01S 13/862* (2013.01); *G01S 13/867* (2013.01)

(56) References Cited

U.S. PATENT DOCUMENTS

| | | | |
|---|---|---|---|
| 7,111,675 | B2 | 9/2006 | Zisk, Jr. |
| 7,322,803 | B2 | 1/2008 | Vogeley |
| 7,484,940 | B2 | 2/2009 | O'Niell |
| 7,597,150 | B2 | 10/2009 | Clem |
| 8,133,041 | B2 | 3/2012 | Ludlow et al. |
| 8,220,533 | B2 | 7/2012 | Longfield et al. |
| 8,511,390 | B2 | 8/2013 | Coyle et al. |
| 2002/0197174 | A1 | 12/2002 | Howard |
| 2003/0010491 | A1 | 1/2003 | Collette |
| 2006/0198742 | A1 | 9/2006 | DiFoggio et al. |
| 2008/0080991 | A1 | 4/2008 | Yuratich et al. |
| 2009/0183879 | A1 | 7/2009 | Cox |
| 2009/0218091 | A1 | 9/2009 | Dotson |
| 2010/0012313 | A1 | 1/2010 | Longfield |
| 2012/0023606 | A1 | 10/2012 | Bouldin et al. |
| 2016/0356594 | A1* | 12/2016 | Sorenson ........... G01B 11/0608 |
| 2019/0203578 | A1* | 7/2019 | Hecht ...................... H02S 99/00 |
| 2019/0218903 | A1* | 7/2019 | Moreno ................... E21B 47/12 |
| 2020/0263531 | A1* | 8/2020 | Fyfe ........................ H04Q 9/00 |

FOREIGN PATENT DOCUMENTS

| | | |
|---|---|---|
| GB | 2 403 752 A | 1/2005 |
| WO | WO 01/20126 A2 | 3/2001 |
| WO | WO 2009/077714 | 6/2009 |
| WO | WO 2011/079218 A2 | 6/2011 |

* cited by examiner

ROD PUMP POSITION MEASUREMENT EMPLOYING WAVE-BASED TECHNOLOGIES

CROSS REFERENCE TO RELATED APPLICATION

This application claims the benefit of U.S. Provisional Application 62/786,126 filed Dec. 28, 2018 entitled, "Rod Pump Position Measurement Employing Wave Based Technologies," and claims the benefit of U.S. Provisional Application Ser. No. 62/779,189, filed Dec. 13, 2018, entitled "Rod Pump Position Measurement Employing Wave-Based Technologies" having common inventors and assignee, the entireties of which are incorporated by reference herein.

FIELD

The present disclosure relates to systems and methods for rod pump position measurement using wave-based technologies, such as LIDAR.

BACKGROUND

A hydrocarbon well may be utilized to produce hydrocarbons from a subterranean formation. Often, a wellbore liquid may build up within one or more portions of the hydrocarbon well. This wellbore liquid, which may include water, condensate, and/or liquid hydrocarbons, may impede flow of the gaseous hydrocarbons from the subterranean formation to a surface region via the hydrocarbon well, thereby reducing and/or completely blocking gaseous hydrocarbon production from the hydrocarbon well.

Sucker rod pumping is the most-popular artificial lift method in the world. A sucker rod pump typically includes a rocking beam with one end coupled to a pump motor by a crank assembly. The crank assembly has a counterweight intended to balance the loading of the motor by offsetting at least part of the weight of the pump connecting rods, which are cantilevered on the opposite end of the rocking beam. Nevertheless, as the rods to the downhole pump are raised and lowered, the loading of the motor passes through a cycle during which potential energy is stored as the pump rods are lifted, and released as the pump rods are lowered.

The motor is typically an electric motor that is geared down to accommodate the relatively low frequency of the pump stroke. A three-phase motor is typical. Motor and circuit protection contactor devices typically are provided for breaking the motor circuit in the event of a short circuit or motor overload. Additionally, a controller that is responsive to conditions in the well may be coupled to the contactor devices, for example to operate the pump intermittently at a rate that can be supported by the geological formation. The controller or the contactor device itself may include means for measuring the current in the motor circuit and/or the line voltage by analog or digital circuits, as a part of the circuit protection function, as well as to vary the operation of the pump to suit conditions at the best efficiency.

Wells are frequently instrumented for purposes of assessing operational parameters. The fluid flow rate produced by the well is an advantageous parameter to measure, and can be measured using flow rate sensors at any point along the conduits through which the fluid is pumped. The fluid pressures produced in the well by the pump can also be monitored, and used to develop additional information, such as the rate at which the geological formation is refilling the pump, and other aspects of well performance. One way to sense well fluid pressure indirectly is to sense tension and compression of the moving pump structures, for example using strain gauges mounted on such structures or load cells coupled between them.

There are a number of aspects of well and/or pump performance that are pertinent to issues of efficiency, maintenance, capacity, switching between operational modes and the like. Optimizing pump operation requires that the operation of the pump be varied to suit conditions. A monitoring system and controller can be provided to sense conditions and to adjust operational parameters such as the frequency of cyclic operation, the manner in which power is coupled to the motor windings and so forth.

A key surveillance tool in sucker rod pumping is dynagraph analysis. A dynagraph is a measurement of rod loading vs. position. These measurements are gathered at the surface and typically transformed to downhole dynagraph "cards" by using variations of the wave equation, which is a second-order linear partial differential equation for the description of waves as they occur in classical physics, such as those that occur in fluid dynamics. The downhole cards are then evaluated to determine whether the pumping system is operating properly, and if not, how it can be improved. Dynagraph analysis has greatly benefited rod pump operation, reliability, and overall performance worldwide.

A weak point in dynagraph analysis can be the position sensor. An incorrect position reading can cause the dynagraph card to "rotate", resulting in an incorrect card shape. If unrecognized, this issue can lead to mistaken conclusions and follow-up actions. Various position sensors have been used over time. Some common devices include position switches, Hall-effect transducers, and inclinometers.

Typically, the position switch depends on a magnet inside the crank arm or counterweight, and is actuated by a reed switch embedded in a wand. A system of this nature may be prone to calibration errors, particularly when pumping system mechanical and/or operating characteristics are changed.

Hall-effect transducers have been used to monitor crank and motor revolutions and have been found to be generally more accurate than position switches. However, the pumping system's API geometry and phase angle must be correct for the Hall-effect system to operate properly.

Inclinometers use an accelerometer to measure the angle of the walking beam as it varies through the stroke. Other developed accelerometer systems ride on the polished rod and use double-integration to determine the rod position. Although the accelerometer-based measurements are presently the most accurate to date, they are still single point, indirect measurements, and require scheduled maintenance/calibration. Furthermore, mechanical devices, particularly those mounted somewhere on the pumping unit, can be prone to mechanical issues such as vibration, wear, and fatigue.

Therefore, what is needed are improved systems and methods for determining rod position for an oil or gas production rod pump.

SUMMARY

In one aspect, disclosed herein is a method of operating a reciprocating system including a rod pump for pumping liquids from a wellbore, the method comprising: determining rod position of the rod pump using a wave-based technology detector, the rod pump comprising a rod string carrying a down hole pump and a drive system including a drive motor coupled to the rod string through a transmission unit; communicating rod position to a data acquisition system receiving one or more other measurements of rod pump operation to determine rod pump performance; and adjusting at least one operating parameter to enhance rod pump performance.

In some embodiments, the wave-based technology detector comprises a multi-dimensional imaging LIDAR, radar, sonar, infrared imaging, or optical imaging detector.

In some embodiments, the multi-dimensional imaging LIDAR includes one or more laser emitters, one or more optical receivers, and a controller in communication with the one or more receivers and the one or more laser emitters.

In some embodiments, the multi-dimensional imaging LIDAR further comprises a first laser emitter that generates a first optical beam having a first wavelength and a second laser emitter that generates a second optical beam having a second wavelength.

In some embodiments, the multi-dimensional imaging LIDAR is a three-dimensional LIDAR.

In some embodiments, the multi-dimensional imaging LIDAR is positioned remotely from the rod pump.

In some embodiments, the wave-based technology detector employs a plurality of multi-dimensional imaging LIDAR units.

In some embodiments, the wave-based technology detector further includes a radar and/or a sonar-sensing device to improve measurement performance during inclement weather or otherwise hostile environmental conditions.

In another aspect, disclosed herein is a method of determining operating parameters and optimizing performance of an oil or gas production rod pump, the method comprising the steps of: determining rod position using a wave-based technology detector positioned to detect the position of a rod string; determining polished rod load using a system comprising a load sensor; communicating rod position and polished rod load to a data acquisition system receiving one or more other measurements of rod pump operation to determine rod pump performance; and adjusting at least one operating parameter to enhance rod pump performance.

In some embodiments, the wave-based technology detector comprises a multi-dimensional imaging LIDAR, radar, sonar, infrared imaging, or optical imaging.

In some embodiments, the multi-dimensional imaging LIDAR includes one or more laser emitters, one or more optical receivers, and a controller in communication with the one or more receivers and the one or more laser emitters.

In some embodiments, the multi-dimensional imaging LIDAR further comprises a first laser emitter that generates a first optical beam having a first wavelength and a second laser emitter that generates a second optical beam having a second wavelength.

In some embodiments, the multi-dimensional imaging LIDAR is a three-dimensional LIDAR.

In some embodiments, the multi-dimensional imaging LIDAR is positioned remotely from the rod pump.

In some embodiments, the wave-based technology detector employs a plurality of multi-dimensional imaging LIDAR units.

In some embodiments, the wave-based technology detector further includes a radar and/or a sonar-sensing device to improve measurement performance during inclement weather or otherwise hostile environmental conditions.

In yet another aspect, disclosed herein is a system for determining rod position of an oil or gas production rod pump, the system comprising: a wave-based technology detector comprising a multi-dimensional imaging LIDAR, radar, sonar, infrared imaging, or optical imaging detector positioned to detect the position of the rod string; and a data acquisition system for receiving one or more other measurements of rod pump operation and determining rod pump performance.

In some embodiments, the system further includes a load sensor for determining polished rod load.

In some embodiments, the multi-dimensional imaging LIDAR comprises one or more laser emitters, one or more optical receivers, and a controller in communication with the one or more receivers and the one or more laser emitters.

In some embodiments, the multi-dimensional imaging LIDAR further comprises a first laser emitter that generates a first optical beam having a first wavelength and a second laser emitter that generates a second optical beam having a second wavelength.

In some embodiments, the multi-dimensional imaging LIDAR is a three-dimensional LIDAR.

In some embodiments, the multi-dimensional imaging LIDAR is positioned remotely from the rod pump.

In some embodiments, the rod positioning measuring system employs a plurality of multi-dimensional imaging LIDAR units.

In some embodiments, the rod positioning measuring system further includes a radar and/or a sonar-sensing device to improve measurement performance during inclement weather or otherwise hostile environmental conditions.

BRIEF DESCRIPTION OF THE DRAWINGS

The present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein. This disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles. Further where considered appropriate, reference numerals may be repeated among the drawings to indicate corresponding or analogous elements. Moreover, two or more blocks or elements depicted as distinct or separate in the drawings may be combined into a single functional block or element. Similarly, a single block or element illustrated in the drawings may be implemented as multiple steps or by multiple elements in cooperation. The forms disclosed herein are illustrated by way of example, and not by way of limitation, in the figures of the accompanying drawings and in which like reference numerals refer to similar elements and in which:

DETAILED DESCRIPTION

Terminology

Figure 1:
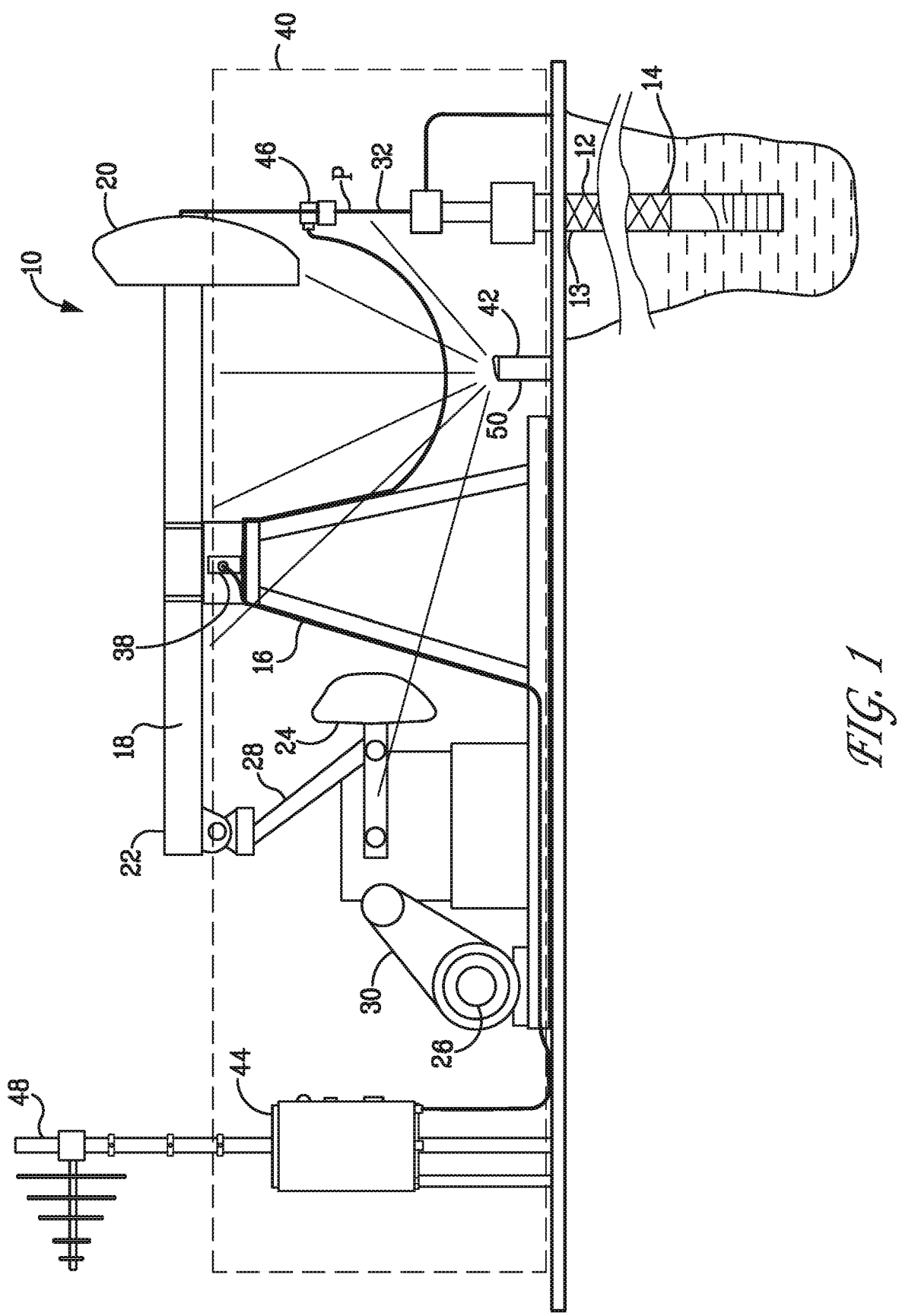
FIG. 1 is a schematic representation of an illustrative, non-exclusive example of a pump arrangement that may be utilized with the systems and methods disclosed herein.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

A/an: The articles "a" and "an" as used herein mean one or more when applied to any feature in embodiments and implementations of the present invention described in the specification and claims. The use of "a" and "an" does not limit the meaning to a single feature unless such a limit is specifically stated. The term "a" or "an" entity refers to one or more of that entity. As such, the terms "a" (or "an"), "one or more" and "at least one" can be used interchangeably herein.

About: As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Above/below: In the following description of the representative embodiments of the invention, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore. Continuing with the example of relative directions in a wellbore, "upper" and "lower" may also refer to relative positions along the longitudinal dimension of a wellbore rather than relative to the surface, such as in describing both vertical and horizontal wells.

And/or: The term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of".

Any: The adjective "any" means one, some, or all indiscriminately of whatever quantity.

At least: As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Based on: "Based on" does not mean "based only on", unless expressly specified otherwise. In other words, the phrase "based on" describes both "based only on," "based at least on," and "based at least in part on."

Comprising: In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Couple: Any use of any form of the terms "connect", "engage", "couple", "attach", or any other term describing an interaction between elements is not meant to limit the interaction to direct interaction between the elements and may also include indirect interaction between the elements described.

Determining: "Determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

Embodiments: Reference throughout the specification to "one embodiment," "an embodiment," "some embodiments," "one aspect," "an aspect," "some aspects," "some implementations," "one implementation," "an implementation," or similar construction means that a particular component, feature, structure, method, or characteristic described in connection with the embodiment, aspect, or implementation is included in at least one embodiment and/or implementation of the claimed subject matter. Thus, the appearance of the phrases "in one embodiment" or "in an embodiment" or "in some embodiments" (or "aspects" or "implementations") in various places throughout the specification are not necessarily all referring to the same embodiment and/or implementation. Furthermore, the particular features, structures, methods, or characteristics may be combined in any suitable manner in one or more embodiments or implementations.

Exemplary: "Exemplary" is used exclusively herein to mean "serving as an example, instance, or illustration." Any embodiment described herein as "exemplary" is not necessarily to be construed as preferred or advantageous over other embodiments.

Flow diagram: Exemplary methods may be better appreciated with reference to flow diagrams or flow charts. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an exemplary method. In some examples, blocks may be combined, may be separated into multiple components, may employ additional blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in series, and/or at substantially different points in time. In some examples, methods may be implemented as processor executable instructions. Thus, a machine-readable medium may store processor executable instructions that if executed by a machine (e.g., processor) cause the machine to perform a method.

May: Note that the word "may" is used throughout this application in a permissive sense (i.e., having the potential to, being able to), not a mandatory sense (i.e., must).

Operatively connected and/or coupled: Operatively connected and/or coupled means directly or indirectly connected for transmitting or conducting information, force, energy, or matter.

Optimizing: The terms "optimal," "optimizing," "optimize," "optimality," "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms may describe one or more of: 1) working towards a solution which may be the best available solution, a preferred solution, or a solution that offers a specific benefit within a range of constraints; 2) continually improving; 3) refining; 4) searching for a high point or a maximum for an objective; 5) processing to reduce a penalty function; 6) seeking to maximize one or more factors in light of competing and/or cooperative interests in maximizing, minimizing, or otherwise controlling one or more other factors, etc.

Order of steps: It should also be understood that, unless clearly indicated to the contrary, in any methods claimed herein that include more than one step or act, the order of the steps or acts of the method is not necessarily limited to the order in which the steps or acts of the method are recited.

Ranges: Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

As used herein, the term "formation" refers to any definable subsurface region. The formation may contain one or more hydrocarbon-containing layers, one or more non-hydrocarbon containing layers, an overburden, and/or an underburden of any geologic formation.

As used herein, the term "hydrocarbon" refers to an organic compound that includes primarily, if not exclusively, the elements hydrogen and carbon. Examples of hydrocarbons include any form of natural gas, oil, coal, and bitumen that can be used as a fuel or upgraded into a fuel.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (20° C. and 1 atm pressure). Hydrocarbon fluids may include, for example, oil, natural gas, gas condensates, coal bed methane, shale oil, shale gas, and other hydrocarbons that are in a gaseous or liquid state.

As used herein, the term "sensor" includes any electrical sensing device or gauge. The sensor may be capable of monitoring or detecting pressure, temperature, fluid flow, vibration, resistivity, or other formation data. Alternatively, the sensor may be a position sensor.

As used herein, the term "subsurface" refers to geologic strata occurring below the earth's surface.

The terms "tubular member" or "tubular body" refer to any pipe, such as a joint of casing, a portion of a liner, a drill string, a production tubing, an injection tubing, a pup joint, a buried pipeline, underwater piping, or above-ground piping, solid lines therein, and any suitable number of such structures and/or features may be omitted from a given embodiment without departing from the scope of the present disclosure.

As used herein, the term "wellbore" refers to a hole in the subsurface made by drilling or insertion of a conduit into the subsurface. A wellbore may have a substantially circular cross section, or other cross-sectional shape. As used herein, the term "well," when referring to an opening in the formation, may be used interchangeably with the term "wellbore."

The terms "zone" or "zone of interest" refer to a portion of a subsurface formation containing hydrocarbons. The term "hydrocarbon-bearing formation" may alternatively be used.

DESCRIPTION

Specific forms will now be described further by way of example. While the following examples demonstrate certain forms of the subject matter disclosed herein, they are not to be interpreted as limiting the scope thereof, but rather as contributing to a complete description.

Figure 2:
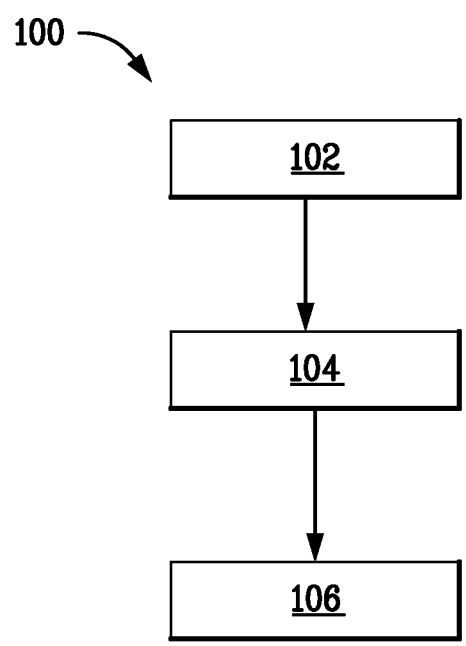
FIG. 2 is a flowchart depicting methods according to the present disclosure.
Figure 3:
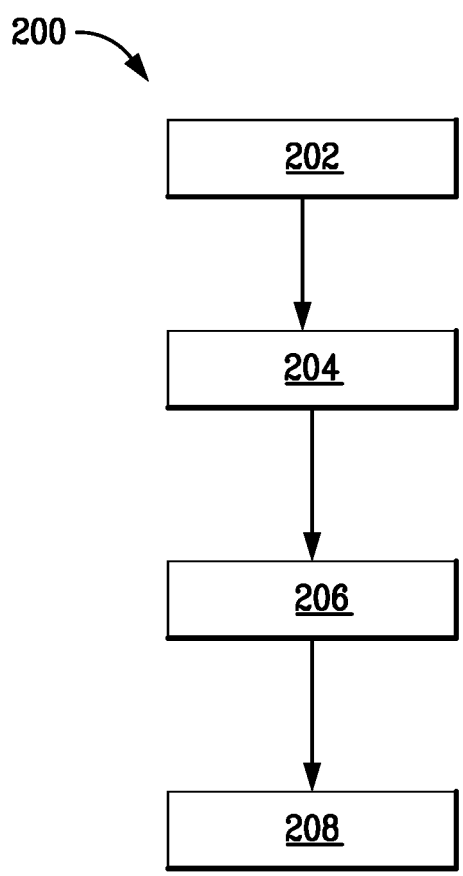
FIG. 3 is another flowchart depicting methods according to the present disclosure.

FIGS. 1-3 provide illustrative, non-exclusive examples of reciprocating systems that may include a rod pump for pumping liquids from a wellbore, and systems and methods for operating such pumps, according to the present disclosure, together with elements that may include, be associated with, be operatively attached to, and/or utilize such methods or systems.

In FIGS. 1-3, like numerals denote like, or similar, structures and/or features; and each of the illustrated structures and/or features may not be discussed in detail herein with reference to the figures. Similarly, each structure and/or feature may not be explicitly labeled in the figures; and any structure and/or feature that is discussed herein with reference to the figures may be utilized with any other structure and/or feature without departing from the scope of the present disclosure.

In general, structures and/or features that are, or are likely to be, included in a given embodiment are indicated in solid lines in the figures, while optional structures and/or features are indicated in broken lines. However, a given embodiment is not required to include all structures and/or features that are illustrated in solid lines therein, and any suitable number of such structures and/or features may be omitted from a given embodiment without departing from the scope of the present disclosure.

Although the approach disclosed herein can be applied to a variety of subterranean well designs and operations, the present description will primarily be directed to a fluid end pump and systems for removing fluids from a subterranean well.

Referring now to FIG. 1, a schematic representation of an illustrative, non-exclusive example of a pump arrangement 10 that may be utilized with the systems and methods disclosed herein is presented. Pump arrangement 10 includes a rod string 12 having a series of downhole rods 13 coupling a downhole piston/chamber pump 14 to an oil or gas production rod pump 16. The oil or gas production rod pump 16 has a rocking beam 18 with one end 20 connected to the downhole rods 12 and an opposite end 22 connected by eccentric linkages 28 to a rotating counterweight member 24. The counterweight member 24 is rotated by an electric motor 26, being coupled by a belt or chain drive 30, and/or coupled to the motor 26 through a gear train (not shown). As the motor 26 turns the counterweight member 24, the beam 18 is rocked to raise and lower the downhole rods 12, operating the pump 14 in a periodic manner at a relatively low frequency.

The motor 26 can be a three phase multi-winding AC motor, for example operable at 440 VAC, and developing 10 to 125 horsepower, depending on the capacity and depth of the pump 14. The pump arrangement 10 can be provided with a contactor operable to activate and deactivate pumping, to change the winding configuration, and/or can be coupled to an overload/underload controller including a processor and timing means.

As shown in FIG. 1, system 40 for determining rod position P of an oil or gas production rod pump 16 is provided. System 40 includes a wave-based technology detector 42, which may comprise a multi-dimensional imaging LIDAR, radar, sonar, infrared imaging, or optical imaging detector positioned to detect the position P of the rod string 12. System 40 also includes a data acquisition system 44 for receiving one or more other measurements of rod pump operation and determining rod pump performance. In some embodiments, system 40 includes a load sensor 46 for determining the load on polished rod 32. In some embodiments, an inclinometer 38 may also be provided to measure the angle of the walking beam 18. In some embodiments, data acquisition system 44 may be operatively connected to one or more antennae 48, to transmit signals to a remote monitoring station (not shown).

As indicated, at least one wave based technology detector 42 is employed in system 40. The use of such a detector enables direct position measurement with the use of relatively simple image recognition techniques, as those skilled in the art will recognize. As may be appreciated, since wave-based technology detector 42 is not mounted on the rod pump 16, it is not subjected to mechanical wear, vibration or fatigue, enhancing reliability. Wave-based technology detector 42 may comprise a multi-dimensional imaging LIDAR detector, a radar detector, a sonar detector, an infrared imaging detector, an optical imaging detector, or a combination thereof.

As indicated, one or more Laser Imaging Detection and Ranging (LIDAR) detectors 50 may be employed as the wave based technology detector 42. As may be appreciated, the use of a pulse of light to measure distance is well known. As is used in devices such as a police speed detector, the basic concept is that of pulsing a laser emitter, which causes a burst of light to be emitted, usually focused through a lens or lens assembly. Then, the time it takes for that pulse of light to return to a detector mounted near the emitter is measured, and a distance can then be derived from that measurement with high accuracy.

When multiple pulses are emitted in rapid succession, and the direction of those emissions is sequentially varied, each distance measurement can be considered a pixel, and a collection of pixels emitted and captured in rapid succession (called a "point cloud") can be rendered as an image or analyzed for other reasons such as detecting obstacles. Viewers that render these point clouds can manipulate the view to give the appearance of a 3-D image. Different schemes may be used to depict the distance measurements that allow the rendering device to show the 3-D image as if it were captured by a live action camera.

Suitable LIDAR detectors are commercially available from a variety of sources, including Velodyne Acoustics, Inc. of Morgan Hill, Calif., LeddarTech Inc. of Quebec City, Canada, and Innoviz Technologies of Rosh Ha'Ayin, Israel.

In some embodiments, the multi-dimensional imaging LIDAR detector 50 comprises one or more laser emitters, one or more optical receivers, and a controller in communication with the one or more receivers and the one or more laser emitters. In some embodiments, the multi-dimensional imaging LIDAR further comprises a first laser emitter that generates a first optical beam having a first wavelength and a second laser emitter that generates a second optical beam having a second wavelength. In some embodiments, the multi-dimensional imaging LIDAR is a three-dimensional LIDAR.

The rod position P of the rod pump 16 obtained using a wave-based technology detector 42 may be used as an input to develop a plot of polished rod load vs. rod position. This plot is known as a surface card.

The load on the polished rod is a summation of every load occurring downhole and is thus a function of the fluid load on the pump, the rod-string design and the buoyant rod weight, the acceleration forces, which are a function of the pumping unit geometry and the direction of rotation, the mechanical friction of the rods-on-tubing, and the viscous frictional forces generated between the rods and fluid. Although there is some value to be had from the surface card, operators are more interested in what is happening downhole at the pump.

To obtain downhole information, the wave equation is used to model the elastic behavior of the rod string 12 in its dynamic motion, which allows the surface measurements acquired from the polished rod 32 to be "waved" downhole to the pump to generate a plot of the load vs position on the pump's plunger. This plot is known as the downhole pump card. By filtering out the effects of the rod-string and everything else occurring above the pump's plunger, the wave equation essentially standardizes the various shapes the pump card greatly improves the ability of the pump performance to be properly diagnosed.

The wave equation is also employed in predictive rod design programs, such as RODSTAR, by Theta, and SRod, by Lufkin. Also available from Echometer is a free software that solves the wave equation, known as QRod.

In addition to acquiring the surface and pump cards over a well's pumping cycle, dynamometers may be used to quantify the amount of fluid slippage leaking by a pump's plunger. When both upper corners of the pump card are rounded-off, fluid slippage is indicated. However, the pump card itself does not provide a means of determining how much slippage is occurring. In order to quantify this value a traveling valve test is performed, wherein the pumping unit is stopped at various points along the up-stroke and the dynamometer records how quickly the fluid load falls off the plunger. Similarly, a standing valve test can be performed by stopping the rods during the down-stroke to see if the pump's standing valve is leaking. If the standing valve is leaking, which allows fluid to drain out of the tubing, the dynamometer will measure a load increase during the test.

The main factors affecting the pump card are incomplete pump fillage, gas interference, tubing movement, and excessive fluid slippage, which may indicate a worn pump. The height of the pump card is a function the fluid load on the plunger, and the fluid load is a function of the plunger diameter and the hydrostatic net lift. The area of the pump card is equivalent to the amount of work being performed by the pump.

The information collected to form the aforementioned cards may be collected by data acquisition system 44 for receiving one or more other measurements of rod pump operation and determining rod pump performance for performance optimization, in accordance with the methods described herein below.

Referring now to FIG. 2, a method of operating a reciprocating system including a rod pump for pumping liquids from a wellbore 100 is presented. The method 100 includes 102, determining the rod position of the rod pump using a wave-based technology detector, the rod pump comprising a rod string carrying a down hole pump and a drive system including a drive motor coupled to the rod string through a transmission unit; 104, communicating rod position to a data acquisition system receiving one or more other measurements of rod pump operation to determine rod pump performance; and 106, adjusting at least one operating parameter to enhance rod pump performance.

In some embodiments, the step of determining the rod position of the rod pump 102 employs a wave-based technology detector comprising a multi-dimensional imaging LIDAR, radar, sonar, infrared imaging, or optical imaging detector.

In some embodiments, the step of determining the rod position of the rod pump 102 employs a multi-dimensional imaging LIDAR including one or more laser emitters, one or more optical receivers, and a controller in communication with the one or more receivers and the one or more laser emitters.

In some embodiments, the step of determining the rod position of the rod pump 102 employs a multi-dimensional imaging LIDAR that includes a first laser emitter that generates a first optical beam having a first wavelength and a second laser emitter that generates a second optical beam having a second wavelength.

In some embodiments, the step of determining the rod position of the rod pump 102 employs a multi-dimensional imaging LIDAR that is a three-dimensional LIDAR.

In some embodiments, the step of determining the rod position of the rod pump 102 employs a multi-dimensional imaging LIDAR that is positioned remotely from the rod pump.

In some embodiments, the step of determining the rod position of the rod pump 102 employs a plurality of multi-dimensional imaging LIDAR units.

In some embodiments, the step of determining the rod position of the rod pump 102 further includes a radar and/or a sonar-sensing device to improve measurement performance during inclement weather or otherwise hostile environmental conditions.

Referring now to FIG. 3, a method of determining operating parameters and optimizing performance of an oil or gas production rod pump 200 is presented. The method includes the steps of 202, determining rod position using a wave-based technology detector positioned to detect the position of a rod string; 204, determining polished rod load using a system comprising a load sensor; 206, communicating rod position and polished rod load to a data acquisition system receiving one or more other measurements of rod pump operation to determine rod pump performance;

and 208, adjusting at least one operating parameter to enhance rod pump performance.

In some embodiments, the step of determining the rod position of the rod pump 202 employs a wave-based technology detector comprising a multi-dimensional imaging LIDAR, radar, sonar, infrared imaging, or optical imaging detector.

In some embodiments, the step of determining the rod position of the rod pump 202 employs a multi-dimensional imaging LIDAR including one or more laser emitters, one or more optical receivers, and a controller in communication with the one or more receivers and the one or more laser emitters.

In some embodiments, the step of determining the rod position of the rod pump 202 employs a multi-dimensional imaging LIDAR that includes a first laser emitter that generates a first optical beam having a first wavelength and a second laser emitter that generates a second optical beam having a second wavelength.

In some embodiments, the step of determining the rod position of the rod pump 202 employs a multi-dimensional imaging LIDAR that is a three-dimensional LIDAR.

In some embodiments, the step of determining the rod position of the rod pump 202 employs a multi-dimensional imaging LIDAR that is positioned remotely from the rod pump.

In some embodiments, the step of determining the rod position of the rod pump 202 employs a plurality of multi-dimensional imaging LIDAR units.

In some embodiments, the step of determining the rod position of the rod pump 202 further includes a radar and/or a sonar-sensing device to improve measurement performance during inclement weather or otherwise hostile environmental conditions.

Illustrative, non-exclusive examples of assemblies, systems and methods according to the present disclosure have been provided. It is within the scope of the present disclosure that an individual step of a method recited herein, including in the following enumerated paragraphs, may additionally or alternatively be referred to as a "step for" performing the recited action.

INDUSTRIAL APPLICABILITY

The apparatus and methods disclosed herein are applicable to the oil and gas industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method of operating a reciprocating system including a rod pump for pumping liquids from a wellbore, the rod pump comprising a rod string carrying a down hole pump and a drive system including a drive motor coupled to the rod string through a transmission unit, the method comprising:

producing an image of the rod pump using a wave-based technology detector, wherein the wave-based technology detector is not mounted on the rod pump;

determining a rod string position using the image of the rod pump;

determining a polished rod load using a system comprising a load sensor;

communicating the rod string position and the polished rod load to a data acquisition system to generate a rod pump performance card;

communicating one or more other measurements of rod pump operation to the data acquisition system;

determining rod pump performance using the rod pump performance card and the one or more other measurements; and adjusting at least one operating parameter to enhance rod pump performance.

2. The method of claim 1, wherein the wave-based technology detector comprises a multi-dimensional imaging LIDAR, radar, sonar, infrared imaging, or optical imaging detector.

3. The method of claim 2, wherein the multi-dimensional imaging LIDAR includes one or more laser emitters, one or more optical receivers, and a controller in communication with the one or more receivers and the one or more laser emitters.

4. The method of claim 2, wherein the multi-dimensional imaging LIDAR further comprises a first laser emitter that generates a first optical beam having a first wavelength and a second laser emitter that generates a second optical beam having a second wavelength.

5. The method of claim 2, wherein the multi-dimensional imaging LIDAR is a three-dimensional LIDAR.

6. The method of claim 2, wherein the multi-dimensional imaging LIDAR is positioned remotely from the rod pump.

7. The method of claim 2, wherein the wave-based technology detector employs a plurality of multi-dimensional imaging LIDAR units.

8. The method of claim 1, wherein the wave-based technology detector further includes a radar and/or a sonar sensing device to improve measurement performance during inclement weather or otherwise hostile environmental conditions.

9. A method of determining operating parameters and optimizing performance of an oil or gas production rod pump, the method comprising the steps of:

producing an image of a rod string using a wave-based technology detector, wherein the wave-based technology detector is not mounted on the rod pump;

determining a rod string position using the image of the rod string;

determining a polished rod load using a system comprising a load sensor;

communicating the rod string position and the polished rod load to a data acquisition system to form a rod pump performance card;

communicating one or more other measurements of rod pump operation to the data acquisition system;

determining rod pump performance using the rod pump performance card and the one or more other measurements; and adjusting at least one operating parameter to enhance rod pump performance.

10. The method of claim 9, wherein the wave-based technology detector comprises a multi-dimensional imaging LIDAR, radar, sonar, infrared imaging, or optical imaging.

11. The method of claim 10, wherein the multi-dimensional imaging LIDAR includes one or more laser emitters, one or more optical receivers, and a controller in communication with the one or more receivers and the one or more laser emitters.

12. The method of claim 10, wherein the multi-dimensional imaging LIDAR further comprises a first laser emitter that generates a first optical beam having a first wavelength and a second laser emitter that generates a second optical beam having a second wavelength.

13. The method of claim 10, wherein the multi-dimensional imaging LIDAR is a three-dimensional LIDAR.

14. The method of claim 10, wherein the multi-dimensional imaging LIDAR is positioned remotely from the rod pump.

15. The method of claim 10, wherein the wave-based technology detector employs a plurality of multi-dimensional imaging LIDAR units.

16. The method of claim 9, wherein the wave-based technology detector further includes a radar and/or a sonar sensing device to improve measurement performance during inclement weather or otherwise hostile environmental conditions.

17. A system for determining rod position of an oil or gas production rod pump, the system comprising:

a wave-based technology detector comprising a multi-dimensional imaging LIDAR, radar, sonar, infrared imaging, or optical imaging detector positioned to produce an image of a rod string, and to detect a position of the rod string from the image, wherein the wave-based technology detector is not mounted on the rod pump;

a system configured to determine a polished rod load, the system comprising a load sensor;

a data acquisition system configured for receiving the position of the rod string and the polished rod load to form a rod pump performance card, and for receiving one or more other measurements of rod pump operation and for determining rod pump performance using the rod pump performance card and the one or more other measurements.

18. The system of claim 17, further comprising a load sensor for determining polished rod load.

19. The system of claim 18, wherein rod pump performance is optimized.

20. The system of claim 17, wherein the multi-dimensional imaging LIDAR comprises one or more laser emitters, one or more optical receivers, and a controller in communication with the one or more receivers and the one or more laser emitters.

21. The system of claim 17, wherein the multi-dimensional imaging LIDAR further comprises a first laser emitter that generates a first optical beam having a first wavelength and a second laser emitter that generates a second optical beam having a second wavelength.

22. The system of claim 17, wherein the multi-dimensional imaging LIDAR is a three-dimensional LIDAR.

23. The system of claim 17, wherein the multi-dimensional imaging LIDAR is positioned remotely from the rod pump.

24. The system of claim 17, wherein the rod positioning measuring system employs a plurality of multi-dimensional imaging LIDAR units.

25. The system of claim 17, wherein the rod positioning measuring system further includes a radar and/or a sonar sensing device to improve measurement performance during inclement weather or otherwise hostile environmental conditions.

* * * * *